3,126,253
PROCESS FOR THE MANUFACTURE OF FINELY DIVIDED CALCIUM CARBONATE
Ernst Podschus, Leverkusen-Bayerwerk, Germany, assignor to Farbenfabriken Bayer Aktiengesellschaft, Leverkusen, Germany, a corporation of Germany
No Drawing. Continuation of application Ser. No. 60,569, Oct. 5, 1960. This application Sept. 10, 1962, Ser. No. 222,705
5 Claims. (Cl. 23—66)

Calcium carbonate precipitated from an aqueous solution has been used as a filler, particularly in the rubber industry, for a long time. In order to attain a reinforcing effect on rubber, the filler should be extremely finely divided while still readily dispersible. If the degree of dispersion is characterized by the specific surface which is customarily determined by the adsorption of nitrogen according to the known method of Brunauer, Emmett and Teller, commercial calcium carbonate rubber fillers are obtained having values between 20 and 35 m.$^2$/g. As can be seen from electron microscope pictures, such calcium carbonate powders consist of almost small cubic crystals which are in part agglomerated to form secondary agglomerates. In general, the tendency to agglomerate is greater, the more finely divided the primary particles. The packing of the latter in the agglomerates may become so dense as to render grinding and dispersion difficult. The density of the packing or, inversely, the degree of loosening can be characterized by the bulk weight, the settling volume and the oil adsorption. Especially the oil adsorption or "oil number," i.e. the amount of linseed oil taken up by 1 g. of the powder until all particles are just completely wetted, gives an indication of the particle surface and the secondary structure obtained.

Processes have already been known which allegedly allow the particle size in calcium carbonate precipitates to be influenced either by maintaining certain conditions of temperature and concentration, or by means of additives. Among the various methods of precipitating calcium carbonate, the method of direct carbonization of milk of lime is distinguished, apart from economy, by the fact that washing of the calcium carbonate can be dispensed with. In this context it is known that the temperature of precipitation should be below 50° C., in order to obtain a precipitate consisting of finely divided calcite.

It has now been found that an especially loose secondary structure and thus also a particularly good dispersibility can be obtained in such precipitates by the addition to the milk of lime of a small amount of an alkali metal as e.g. sodium and potassium or alkaline earth metal as e.g. calcium or barium salt of nitrilotriacetic acid. Compared with the known products, the calcium carbonate thus obtained is distinguished by a particularly loose secondary structure recognizable by an increased oil adsorption and, in addition, by a large specific surface and a different appearance of the calcite crystals. Instead of the usual rhombohedrons, the particles chiefly form oblong spherical small rods which partially agglomerate to form more lengthy rods. The X-ray diffraction pattern shows strongly decreased intensities with increasing orders of magnitudes thus indicating a disturbed lattice.

It is true that it has already been proposed to carry out the precipitation of calcium carbonate with the addition of complex-forming compounds, in order to obtain a very finely divided calcium carbonate which is suitable as a filler. Polyphosphates and polybasic hydroxycarboxylic acids have been mentioned as complex-forming compounds of this kind. However, attempts to reproduce this process resulted only in relatively coarse crystalline products. Likewise, the applicant's own experiments have shown that ethylenediamine-tetra-acetic acid used for some time as a complex-forming agent, has not the effect of the nitrilotriacetic acid to be used according to the invention.

The object of the invention is therefore to provide a process for the manufacture of finely dispersed calcium carbonate consisting of crystallites with disturbed calcite lattice and having an especially loose secondary structure and a particularly good dispersibility, characterized by reacting aqueous calcium hydroxide suspensions with a gas containing carbon dioxide while adding 0.01–5 percent by weight, preferably 0.1–2 percent by weight, of an alkali metal such as sodium or alkaline earth metal such as calcium salt of nitrilotriacetic acid, referred to the amount of calcium carbonate to be precipitated at temperatures below 50° C., preferably below 30° C.

The calcium hydroxide may be used in the form of slaked or unslaked lime. The milk of lime thus obtained should preferably contain not more than 1 mol of $Ca(OH)_2$ per litre. Contaminations and coarse particles are removed. For this purpose, treatment in a hydrocyclone has proved to be particularly expedient. The carbon dioxide is preferably employed in the form of waste gases, for example purified combustion gases containing 10–20 percent by volume of $CO_2$ or lime kiln gas having about 40 percent by volume $CO_2$. The distribution of the gas can be attained with especial advantage by means of jet tubes with intensive stirring, or by means of high speed turbo-stirrer such as Hoesch or Kotthoff stirrer, the gas being introduced from below or from above into the turbine thus breaking it up into fine bubbles. In order to attain fine particles, precipitation should proceed as rapidly as possible; the gas must therefore be introduced at a speed so that carbon dioxide is still detectable in the spent gas stream. However, the $CO_2$ concentration of the gas should be less than 40, preferably between 10 and 30 percent by volume, since it has unexpectedly been found that a gas having a substantially higher concentration yields a coarse-grained precipitate, although the precipitation proceeds most rapidly.

The following examples are given for the purpose of illustrating the invention.

*Example 1*

444 g. of calcium hydroxide (marble white lime) are suspended in water so that 12 litres of a 0.5-molar suspension are formed. To this suspension are added 4.5 g. of sodium nitrilotriacetate, while stirring with a turbo-stirrer (Kotthoff mixing mill, rotor diameter: 75 mm.). Through a tube ending about 10 mm. above the rotor of the stirrer, a gas stream is then introduced which is obtained by mixing 500 litres of $CO_2$ and 2000 litres of air per hour. In the course of precipitation, the temperature rises from 17 to 25° C. After about 30 minutes the reaction is completed, the pH value being 7.1.

The amount of carbon dioxide employed is about twice that of the proportion actually utilized. The precipitated calcium carbonate is filtered off, washed in order to remove the small amount of sodium salt, dried at 110° C. and ground in a pin-mill. A similar precipitation without the addition of nitrilotriacetate, but under otherwise equal experimental conditions, yields a calcium carbonate which approximately corresponds to the finest commercial fillers. The properties of the two products are compared in the following table:

|  | Water content of the filter cake, percent by weight | Specif. surface, m.²/g. | Oil adsorption, ml./g. | Bulk weight shaken, g./l. |
| --- | --- | --- | --- | --- |
| With nitrilotriacetate | 65 | 45 | 0.85 | 260 |
| Without nitrilotriacetate | 54 | 32 | 0.56 | 403 |

The higher moisture content of the filter cake obtained according to the invention already indicates more finely divided particles and this is confirmed by the values of the specific surface. The difference in oil adsorption and bulk weight shows that this calcium carbonate powder, notwithstanding its more finely divided primary particles, possesses a looser secondary structure. The X-ray diffraction pattern shows a disturbed calcite structure, whilst calcium carbonate precipitated without additive consists of well-crystalline calcite. The electron microscope images of the two preparations likewise differ characteristically in the manner described above. Another striking property of the powder produced according to the invention is its brighter whiteness.

Example 2

To 50 litres of a 0.5-molar calcium hydroxide suspension are added 37 g. of the same sodium nitrilotriacetate product as in the preceding example and, in the manner described therein, a gas stream mixed from 1200 litres of $CO_2$ and 4800 litres of air per hour is introduced. After 80 minutes, the precipitation is completed, the pH value being 6.9. The temperature has risen from 17 to 27° C. The amount of carbon dioxide employed in relation to the proportion actually utilized is even larger than in the preceding example, the calcium carbonate obtained even more finely divided. The moisture content of the filter cake is 67 percent by weight, the specific surface of the dry and ground product 62 m.²/g. and the oil number 0.77 ml./g.

This application is a continuation of application Serial No. 60,569, filed October 5, 1960, now abandoned.

I claim:
1. In a process for the manufacture of finely divided calcium carbonate by reacting an aqueous suspension of calcium hydroxide with a gas containing carbon dioxide at a temperature between about 0 and about 50° C., the improvement which comprises effecting the reaction in the presence of a salt of nitrilotriacetic acid selected from the group consisting of the alkali metal and alkaline earth metal salts of the said acid.
2. Process as claimed in claim 1 in which the reaction is effected in the presence of sodium nitrilotriacetate.
3. Process as claimed in claim 1 in which the reaction is effected in the presence of calcium nitrilotriacetate.
4. Process as claimed in claim 1 in which the reaction is effected in the presence of 0.01 to 2 percent by weight of sodium nitrilotriacetate.
5. Process as claimed in claim 1 in which the reaction is effected in the presence of 0.01 to 2 percent by weight of calcium nitrilotriacetate.

References Cited in the file of this patent
UNITED STATES PATENTS

| 2,058,503 | Rafton | Oct. 27, 1936 |
| 2,211,796 | Schnerder | Aug. 20, 1940 |
| 2,500,019 | Bersworth | Mar. 7, 1950 |
| 2,642,335 | May | June 16, 1953 |

FOREIGN PATENTS

| 1,025,847 | Germany | Mar. 13, 1958 |